Patented Jan. 29, 1929.

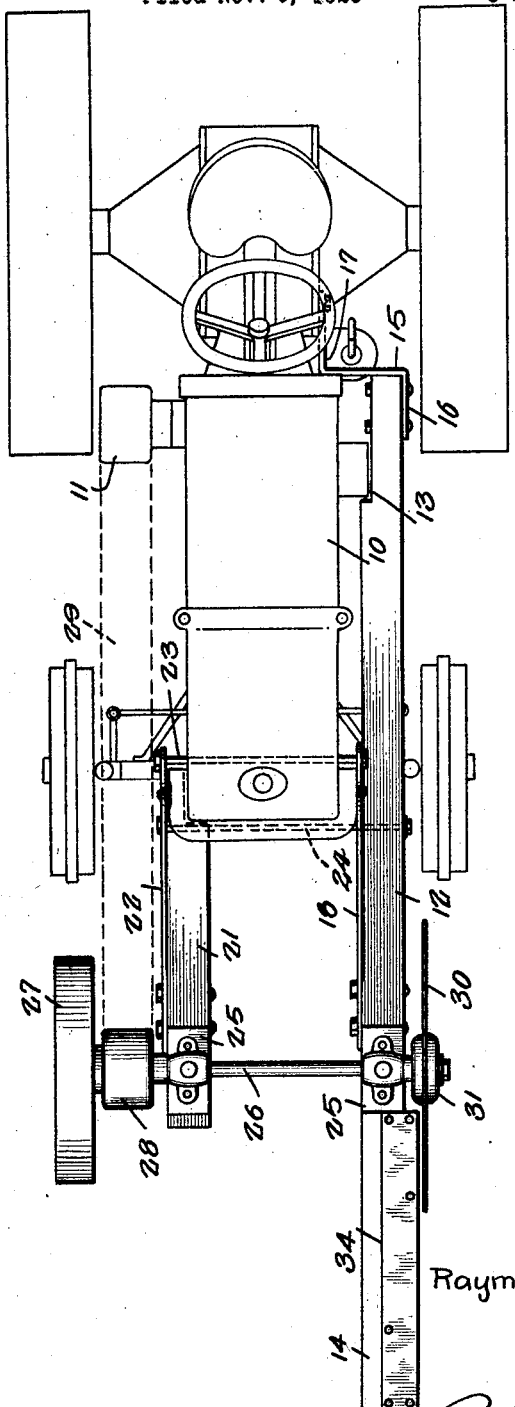

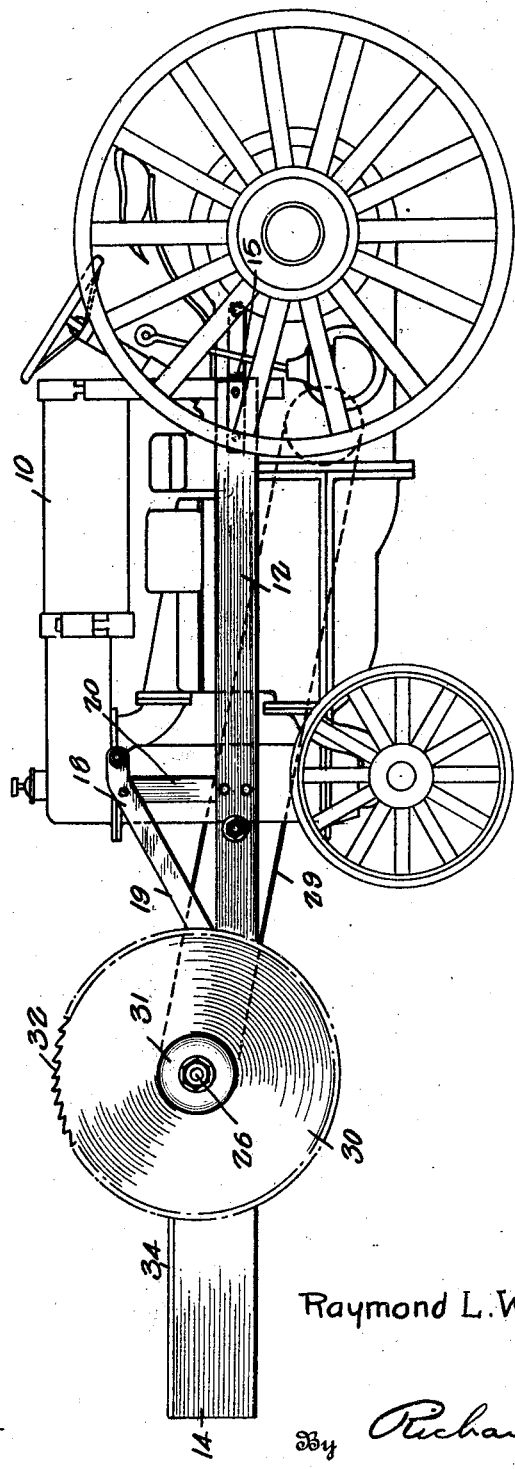

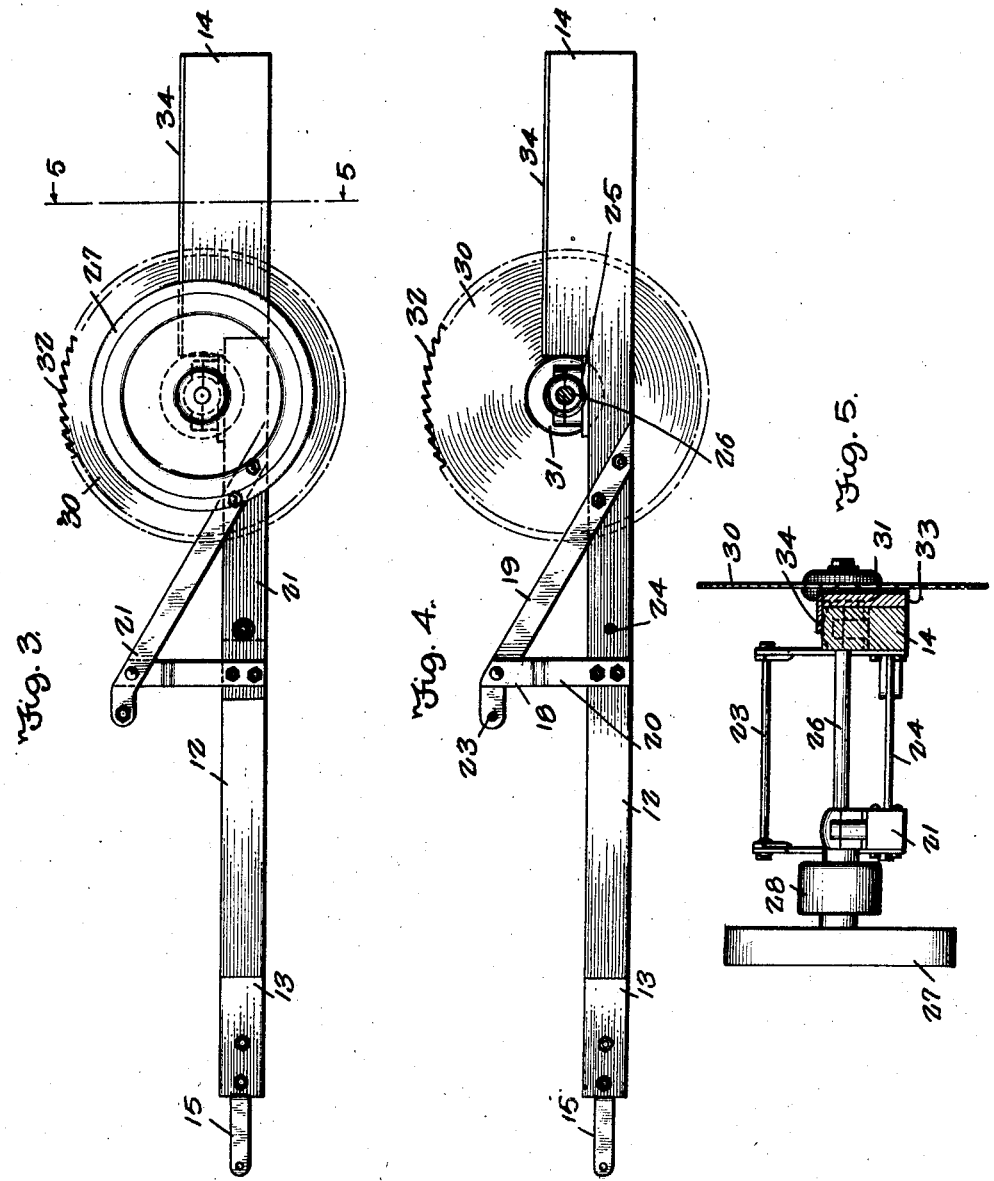

1,700,423

UNITED STATES PATENT OFFICE.

RAYMOND L. WALKER, OF BOSCOBEL, WISCONSIN.

SAW FRAME.

Application filed November 9, 1925. Serial No. 67,932.

This invention relates to improvements in saw frames and has particular reference to a portable type of frame adapted to be mounted upon a tractor or the like.

An important object of the invention is the provision of a saw frame adapted to be securely fastened upon a tractor or similar vehicle and arranged so as to be operated by the motor thereof.

A still further object of the invention is to provide a saw frame which may be conveniently secured upon a tractor and arranged so as to be readily operable in association therewith.

Still another object of the invention is to provide a saw frame of simple and durable construction particularly designed to be firmly secured on a tractor or the like and which may be manufactured at a reasonable cost.

Other objects and advantages of the invention will become apparent as the description progresses.

In the accompanying drawings forming a part of this specification and in which like reference characters are employed to designate corresponding parts throughout the same:

Figure 1 is a top plan view of my improved frame structure shown in operative position upon a tractor;

Figure 2 is a side elevation of the same;

Figure 3 is a side elevation of the structure looking at the side opposite the side shown in Figure 2;

Figure 4 is a longitudinal sectional view taken through the center of the frame, and Figure 5 is a transverse sectional view taken on the line 5—5 of Figure 3.

In the drawings, wherein for the purpose of illustration is shown the preferred embodiment of my invention, the numeral 10 generally indicates a conventional type of tractor provided with a drive pulley 11 extending from the intermediate portion connected with the drive motor so as to be rotated thereby. This tractor is of a well known construction and forms no part of my invention, being merely illustrated to indicate the application of my improved apparatus in association therewith.

My invention relates particularly to a saw frame adapted to be securely attached to this particular type of tractor, and with slight modification to be mounted upon various other well known types of tractors. Referring now with particularity to the frame structure embodying my invention, the numeral 12 indicates a main support beam preferably constructed of wood and rectangular in cross section. The inner side of the beam is recessed at its rear extremity as at 13 to permit convenient mounting of this beam on the tractor. The forward portion of the beam 12 is of substantially enlarged construction so as to provide an elevated platform section 14. The support beam 12 is arranged in a horizontal position on the side of the tractor and secured to the intermediate portion thereof by a suitable structure to be described more fully hereinafter.

Bolted or otherwise secured to the rear extremity of the frame beam 12 is an offset connecting bracket 15 formed of a metallic strip bent to provide a transversely extending connecting portion and longitudinally extending projections, the forward projection being positioned in contact with the outer side of the beam 12 and secured thereto as at 16 while the oppositely directed connecting portion 17 is secured by one of the bolts of the transmission housing, as shown to advantage in Figures 1 and 2.

Secured to the intermediate portion of the frame beam 12 and extending upwardly is a bracket 18 including an inclined bar 19 having its lower end bolted to the beam and its upper portion extending horizontally, and a vertical support bar 20 bolted at its lower end to the beam and at its upper end to the upper portion of the bar 19.

Mounted in parallel position upon the opposite side of the tractor is an auxiliary frame beam 21 secured to the tractor frame and extending forwardly thereof. This beam carries a bracket 22 corresponding to the bracket 18 and arranged opposite the same. As shown in Figures 1 and 3 of the drawings, the beam 21 is comparatively short and provided with a recess, corresponding to the recess 13 of the beam 12, to permit convenient connection with the tractor. The bars 19 and 22, are secured to the forward portion of the tractor by a transversely extending rod 23 having a head formed on one end, the ends of the rod extending through alined openings formed in the ends of the said bars, the other end of the rod being threaded for the application of a securing nut. This rod extends through the tractor frame immediately behind the radiator, and if necessary may extend through a portion of the tractor structure to prevent displacement. The beams 12 and 21 are braced by a rod 24 secured at its ends in the beams.

Mounted in transverse alinement on the upper sides of the frame beams 12 and 21 adjacent their forward ends are bearings 25 rotatably supporting a shaft 26. The end of the shaft which projects beyond the frame beam 21 carries a fly wheel 27 secured to the shaft so as to rotate therewith and efficiently balance the same. Fixed upon the shaft 26 between the fly wheel 27 and the beam 21 is a pulley 28 in alinement with a drive pulley 11. The pulley 28 is driven by a belt 29 trained over the pulleys. Detachably mounted upon the other end of the shaft 26 is a circular saw 30 of comparatively large diameter provided at its central portion with a hub 31 and at its periphery with teeth 32. The saw hub 31 may be provided with a rectangular bore engageable with a suitably formed extension on the shaft 26 so that the saw will be positively driven by rotary movement of the shaft.

In order that a work supporting bed may be provided, an attaching board 33 is mounted upon the outer side of the beam 12, and a metallic plate 34 is disposed upon and secured to the upper edge of the board and the upper side of the beam. With particular reference to Figure 1, it will be seen that this construction will provide a convenient bed arranged adjacent to the saw 30.

In use, it is obvious that my improved saw frame construction may be readily assembled upon the conventional type of tractors without altering the structure thereof or interfering with the convenient operation. The frame structure may be readily assembled on the tractor in the manner previously described and may be readily removed when desired. After the saw frame, and the parts mounted thereon, has been securely fastened upon the tractor frame, the drive belt 29 is applied over the pulleys 11 and 28. The tractor is then driven to the desired position, and the gears shifted so as to impart rotary motion to the drive pulley 11. Rotary movement of the pulley 11 will cause similar simultaneous movement of the shaft 26 and the fly wheel and saw 30 secured thereon.

It is to be understood that the form of my invention herewith shown and described is to be taken as the preferred example of the same and that various changes as to the shape, size and arrangement of parts may be resorted to without departing from the spirit of the invention or the scope of the subjoined claim.

Having thus described my invention, I claim:

The combination with a tractor including a motor driven pulley located at one side thereof, of a sawing attachment for the tractor comprising a frame beam extending along the side of the body of the tractor opposite the side at which the pulley is located and from the rear end of the body to a considerable distance in front of the body, a similar beam disposed with its rear end close to the body at said side thereof at which the pulley is located and extending forwardly beyond the body a shorter distance than the first mentioned beam, means securing the rear end of the first mentioned beam to a part of the tractor, vertically disposed bracket bars associated each with a respective one of said beams, the lower end of the bar which is associated with the first mentioned beam being secured to the inner side of said beam, the lower end of the other bracket bar being secured to the outer side of the other beam, the attached lower ends of the bracket bars being oppositely located, a rod extending through the front portion of the body of the tractor and at its ends through the upper ends of said bracket bars, a rod extending transversely between the rear end of the second mentioned beam and the intermediate portion of the first mentioned beam and in contact with the forward side of the body of the tractor, each of said bracket bars being downwardly and forwardly inclined from a point in advance of the rear end thereof, upstanding spacing uprights secured at their lower ends to the said beams and secured at their upper ends each to a respective one of the bracket bars near the rear end thereof, bearings mounted upon the beams adjacent the points of connection of the lower ends of the bracket bars with the beams, a shaft rotatably journaled in the bearings, a pulley upon the shaft in advance of the motor pulley of the tractor, a saw blade fixed upon the shaft at its end which is next adjacent the first mentioned beam and occupying a plane parallel to and spaced with respect to the outer face of said beam, and a work supporting bed plate upon the forward portion of said beam in advance of the saw blade.

In testimony whereof I affix my signature.

RAYMOND L. WALKER.